United States Patent [19]
Lamm

[11] Patent Number: 6,078,907
[45] Date of Patent: Jun. 20, 2000

[54] METHOD AND SYSTEM FOR ELECTRONICALLY PRESENTING AND PAYING BILLS

[76] Inventor: David Lamm, 204 Marcin La., Burnsville, Minn. 55337

[21] Appl. No.: 09/025,168

[22] Filed: Feb. 18, 1998

[51] Int. Cl.[7] .......................... G06F 157/00; G06F 17/00
[52] U.S. Cl. ................................ 705/40; 705/42; 705/44
[58] Field of Search .......................... 705/35–40, 42–44

[56] References Cited

U.S. PATENT DOCUMENTS

| | | | |
|---|---|---|---|
| 5,220,501 | 6/1993 | Lawlor et al. ............................. | 705/40 |
| 5,237,159 | 8/1993 | Stephens et al. ......................... | 705/30 |
| 5,265,033 | 11/1993 | Vajk et al. ............................... | 709/206 |
| 5,326,959 | 7/1994 | Perazza .................................... | 705/40 |
| 5,383,113 | 1/1995 | Kight et al. .............................. | 705/40 |
| 5,412,190 | 5/1995 | Josephson et al. ...................... | 705/45 |
| 5,465,206 | 11/1995 | Hilt et al. ................................ | 705/40 |
| 5,473,143 | 12/1995 | Vak et al. ................................ | 235/380 |
| 5,475,740 | 12/1995 | Biggs, Jr. et al. ...................... | 379/91.02 |
| 5,477,040 | 12/1995 | Lalonde .................................. | 235/380 |
| 5,483,445 | 1/1996 | Pickering ................................ | 705/40 |
| 5,532,464 | 7/1996 | Josephson et al. ...................... | 705/45 |
| 5,649,117 | 7/1997 | Landry .................................... | 705/40 |
| 5,655,089 | 8/1997 | Bucci ...................................... | 705/40 |
| 5,754,434 | 5/1998 | Delfer et al. ............................ | 364/478.11 |
| 5,790,793 | 8/1998 | Higley ..................................... | 709/218 |
| 5,802,499 | 9/1998 | Sampson et al. ........................ | 705/35 |
| 5,870,724 | 2/1999 | Lawlor et al. ........................... | 705/42 |

*Primary Examiner*—James P. Trammell
*Assistant Examiner*—Cuong H. Nguyen
*Attorney, Agent, or Firm*—Dorsey & Whitney LLP

[57] ABSTRACT

A system and method for preparing and electronically delivering a bill to a billed party. The method may comprise receiving from a billing party an electronic bill file, preparing a redacted bill file from the electronic bill file by redacting selected secured billing information from the electronic bill file, sending the redacted bill file electronically to the billed party, and preparing and outputting a reconstructed bill at the billed party's computer by inserting the selected secured billing information into the redacted bill file. The act of preparing and outputting a reconstructed bill may further comprise the act of inserting standard bill components into the redacted bill file to create a reconstructed bill.

32 Claims, 6 Drawing Sheets

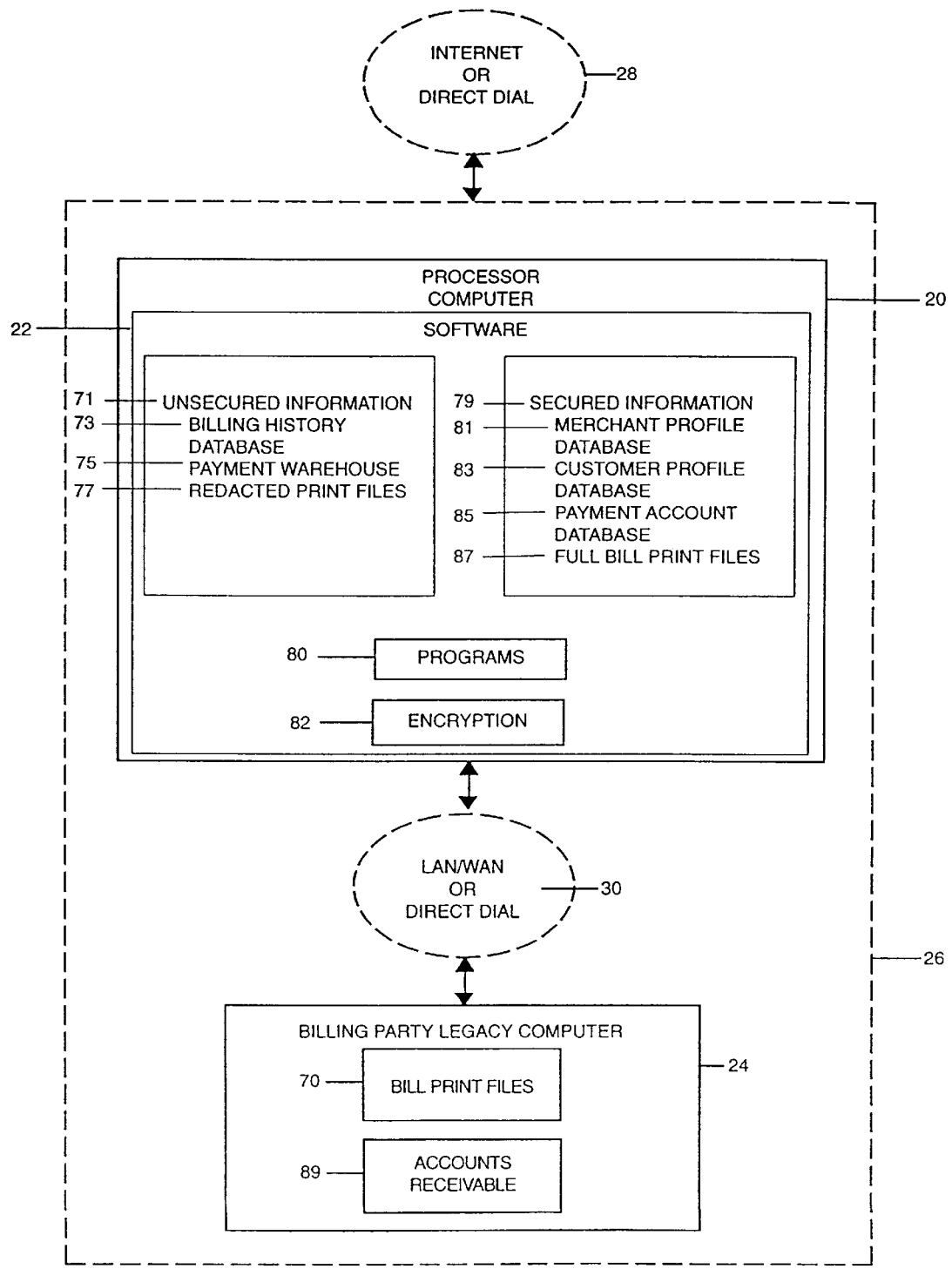

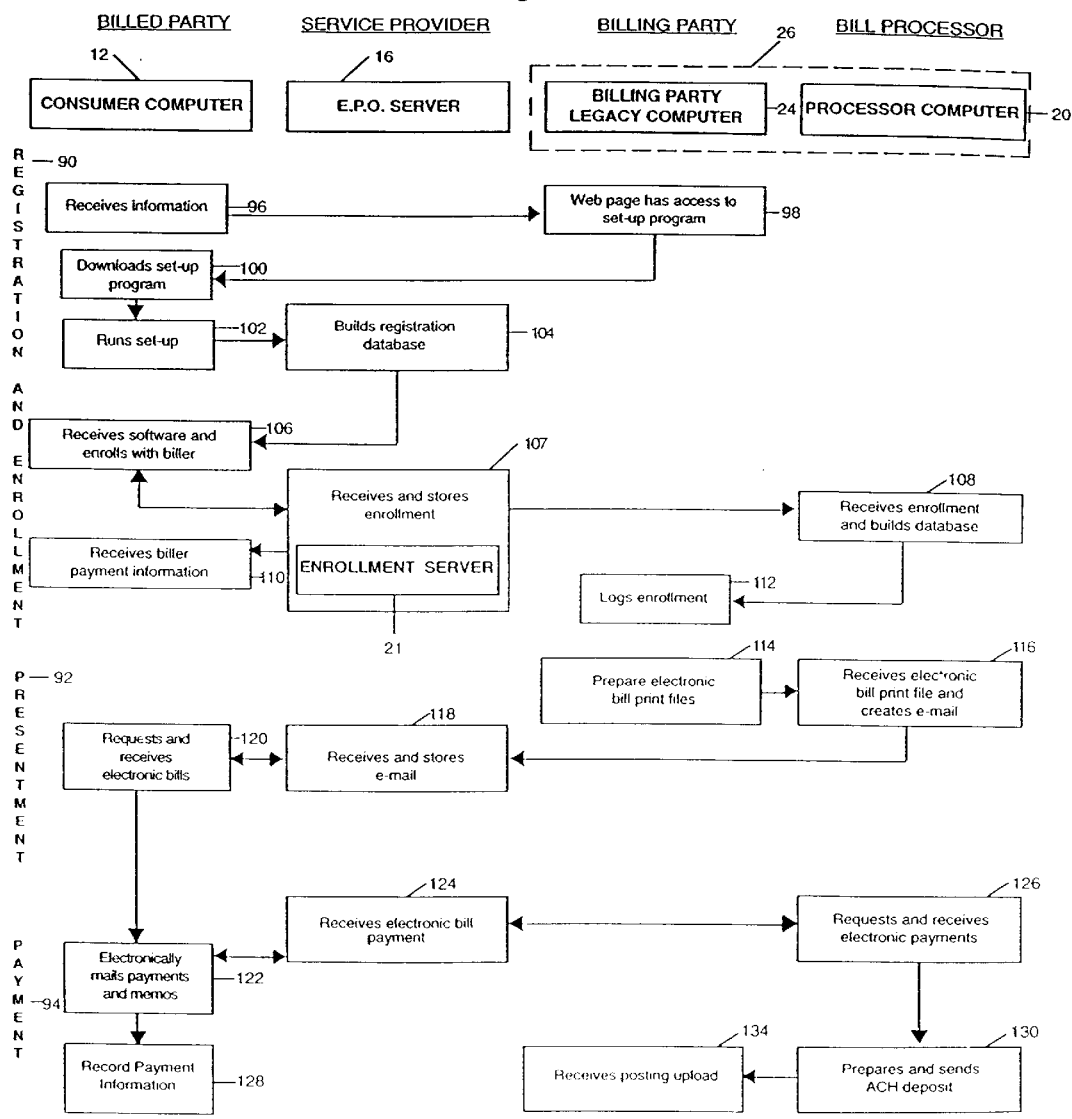

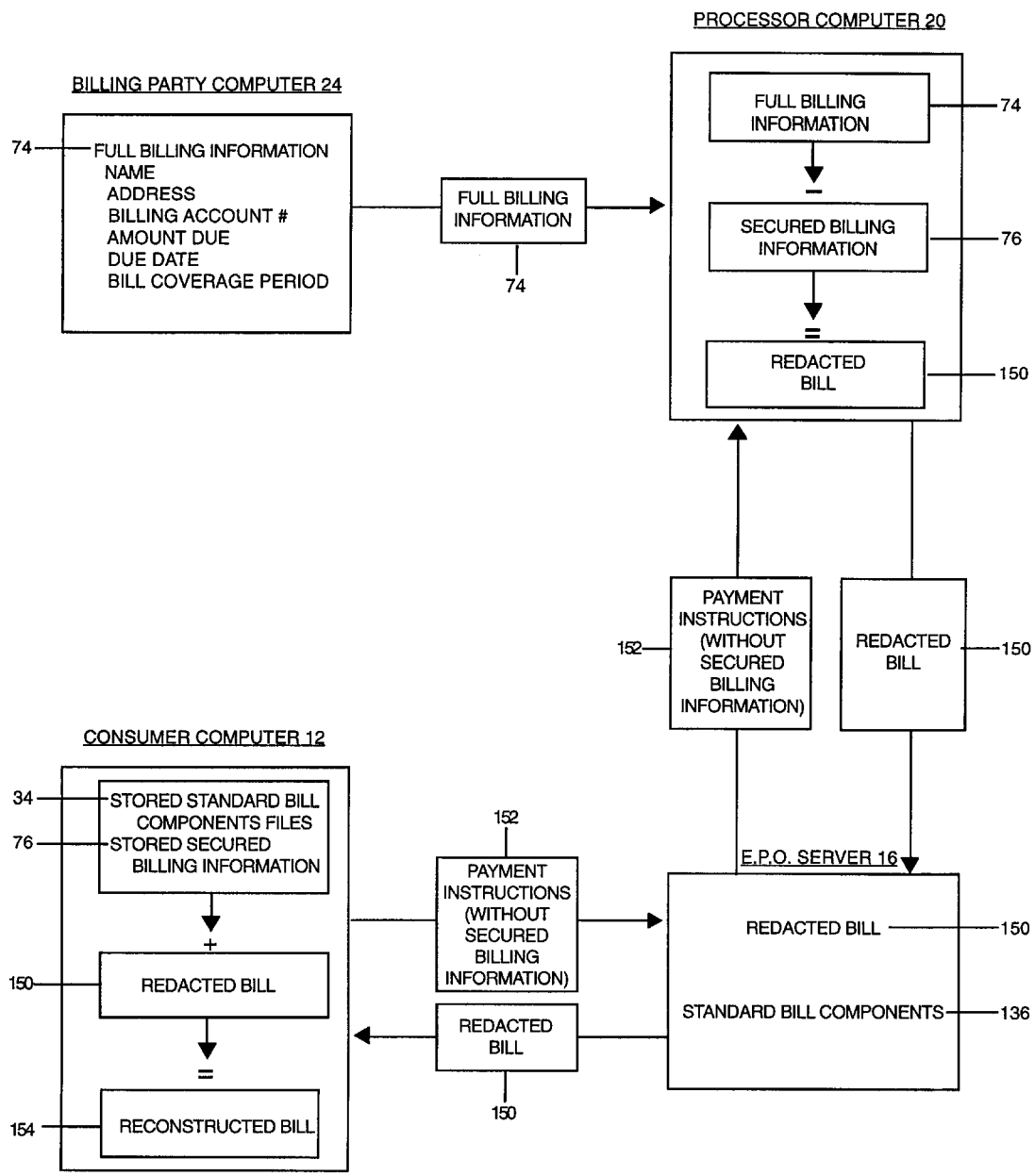

Fig. 7

○
∞ ———— 160
○○○
○○○○
BILLING
PARTY

| Account Number | Date Due | Please Pay | Amount Enclosed |
|---|---|---|---|
| 396475220-8415 | 12/27/97 | $40.00 | |

76     60     60

1401 Filmore Street
SF CA 94115

JOHN DOE ——————————— 76
200 NONESUCH STREET ———— 76
MINNEAPOLIS MN 55455

1209834509843509999494949494949498345093845

Questions: Call 24 Hours 7 Days A Week    or write us at:
San Francisco Bay Area:    415-223-4311    1401 Filmore Street ———— 162
Outside Metro Area:    800-331-9000    SF CA 94115
Hearing Impaired:    800-331-9001

| Billing Summary | |
|---|---|
| Previous Balance 11/11 | $20.00 |
| Payment Received As Of 11/20 | $20.00CR |
| Balance As Of 12/10 | $00.00 |
| Current Charges 12/10 | $40.00 |
| Total | $40.00 |

Please pay on or before the date due to avoid assessment of a late payment charge 2 working days after the due date.

Statement Date: 12/10/97
Bill Coverage Period 11/11/97 – 12/10/97 ———— 60     162

METHOD AND SYSTEM FOR ELECTRONICALLY PRESENTING AND PAYING BILLS

BACKGROUND OF THE INVENTION

1. Field of the Invention

This invention relates to bill presentment and payment methods and systems. More particularly, this invention relates to computerized methods and systems for presenting and paying bills. The methods and systems are implemented in computer hardware and software.

2. Background Information

For many years consumers have paid bills by writing personal checks. Billing parties commonly print and mail paper bills to consumers, and consumers respond by writing and mailing payment checks back to the billing parties. Numerous cost and efficiency problems result from this traditional method for paying bills. The billing parties incur the costs of printing and sending out many bills and receiving and processing many checks. These costs include postage, printing expenses, other overhead costs associated with preparing bill mailings to send via the post office, and the costs of handling many check payments received in mail envelopes. Consumers, similarly, incur postage costs, check or bank charges, and the frustration of dealing with paper bills, such as keeping records of numerous bills. Throughout this specification, "billed party" will be used to refer to any entity, such as a consumer or business, that makes bill payments to one or more billing parties. A typical billed party could be a person who owes a lump sum or monthly payments for a stereo system bought from a merchant, but could also be a small or larger business that buys on account. "Billing party" will be used to refer to an entity, such as a merchant, that bills a billed party or a processor that processes payments for billing parties.

Billing parties may use processing operations, often outsourcing the work to bill and payment processing centers, to deal with large numbers of bills and check payments. Billing parties prepare bill statement information and then send that information to a processing center. The bill statement information is commonly prepared by the billing parties electronically as bill printing files on computer systems and then electronically sent via a Local Area Network (LAN), Wide Area Network (WAN), or direct dial connection to a processing center. The processing center prints the paper bills, integrating the bill print files with standard bill formats or forms to produce a printed paper bill. The processing center mails paper bills to consumers and receives the payments from those consumers. Processing of the payments is the next common step for processing centers. It involves opening the payment envelopes, preparing payment checks for deposit, and sending deposits to banks. The processing centers also record consumer payments; these records of consumer payments are then communicated to the billing parties as the basis for the next billing cycle and various market research purposes.

OCR (Optical Character Recognition) payment stubs are often included with each bill sent to a consumer. These OCR payment stubs, if mailed by the consumer with a payment check, allow the processing center to process payments more readily by electronically reading billing information into computers. The use of these OCR payment stubs simplifies processing, but problems result when consumers do not pay the entire amount due on the payment stub, the payment stub becomes not computer-readable, or the consumer does not mail the payment stub with the payment. Even when functioning smoothly, this processing system requires large amounts of time and money to process paper bills, checks, and stubs.

Electronic bill payment systems have been developed that reduce the reliance on paper bills and checks. Some electronic bill payment systems allow consumers with personal computers to pay bills without writing paper checks and/or without receiving paper bills. Some model electronic billing systems, such as MSFDC's Electronic Bill Presentment and Payment (EBPP) system and CheckFree's E-Bill system, utilize Internet technology and the World Wide Web (WWW) to bill consumers.

The Internet is a collection of computer networks that allows computer users to share files and other computer resources. The collection of networks linked together using files written in Hypertext Mark-up Language (HTML) is known as the WWW. Computer users can view information available on computers or networks on the WWW through the use of browsing software (such as Netscape Navigator, Microsoft Internet Explorer, or Mosaic browsers). A computer functioning as a server on the Internet operates a web site, which supports files in the form of documents and pages. When a user's browser requests information from the web site, the user receives a web page, which is a document formatted according to HTML.

Model electronic billing systems, such as those referenced above, use centralized payment processing centers and the Internet. The centralized payment processing center is developed as a web site on the WWW. Billing parties send electronic bill print files via a communications interface to these centralized payment processing centers, and the bill statements are stored on the web site. The centralized payment processing centers prepare the bills to be accessible over the Internet on the web site. The consumer can then access and manipulate his/her bills on the WWW on-line. When the consumer requests a bill, a template is used by the web site to build an HTML presentation of the bill, which is presented as a web page to the consumer.

In some electronic payment systems, the electronic bill print file is used to create a relational database for HTML presentation of the bill. In these systems, when the centralized processing centers prepare bills from the electronic bill print files received from the billing parties, a relational database of the information is created. Information from the electronic bill print files is removed and placed in this relational database. The creation of relational databases requires an understanding of every element from the electronic bill print files so that the HTML presentation of a bill is successful. In other electronic payment systems, rather than using electronic bill print files, the billing party legacy system must create a separate relational database for HTML presentation.

Security measures, such as passwords, control access to the bill statements stored in the centralized payment processing centers on the WWW. The consumer typically must send payment authorization for a bank account, credit card, or debit card to pay bills electronically. The consumer sets up payment authorization by filling out information on the web page, such as a checking account or credit card number and authorization for payment or charge, and by transmitting this information over the WWW.

Delivery of electronic bill statements from billing parties and electronic payment authorizations from consumers could be accomplished using conventional electronic mail (e-mail). However, conventional e-mail is not commonly used for delivery of bill statements and payment information, because it often results in problems. Standard Internet e-mail uses Simple Mail Transfer Protocol (SMTP). SMTP sends e-mail on the Internet and stores it in a number of different e-mail servers, which may use different operating platforms. E-mail using SMTP is sometimes inaccurate or does not reach the intended receiver. For this reason, the use of SMTP e-mail may be problematic for the delivery of data for electronic bill payment systems.

When bills are presented to or payments provided by consumers using standard Internet browsers over the WWW, private data (such as names associated with social security numbers, bank account numbers, and credit card numbers) may be stored on the web site. The storage and transmission of private billing information on the Internet creates two potential problems: security and privacy. This information can become the target of computer hackers, and consumers and billing parties are concerned about security for monetary transactions on the Internet. The storage of private information on the Internet also allows billing parties or computer hackers to ascertain a consumer's payment habits, behaviors, and preferences. Consumers are concerned about this kind of information use (and misuse).

Another problem with existing electronic payment systems using the WWW is the form of the bill. If the billing statement is to have all of the same graphical elements as the paper bill to which the consumer is accustomed and all the credit or other legal disclosures that may be required, this adversely affects the length of time required to provide the electronic bill on the consumer's computer screen over the Internet. In order to access information from the WWW using a browser, the entire image must be downloaded from the Internet server to the consumer's computer and then processed by the browser before the consumer can fully see and access it. A consumer may become impatient waiting for a graphics-oriented web page to appear on his/her computer screen. Information delivery on the Internet can be frustrating, because it is much slower than delivery of data from the consumer's computer hard drive.

Slow information delivery over the Internet not only frustrates consumers, but it also causes electronic payment system providers to produce electronic bills that can be delivered more quickly to the consumers' computers. These electronic bills may lack graphic image elements that enhance readability and may follow standard web page format. This standard format also causes electronic bills to look very different from the standard paper bills to which the consumer is accustomed. Billing parties may also lose the logos and layout designs that make their bills recognizable and distinguishable from other bills.

In the model electronic payment system, centralized payment processors replace existing paper payment processing centers. The billing parties, therefore, send their bill statement information to the centralized payment processing centers instead of to their traditional, mail-based payment processing centers. The traditional paper processing centers are left with only that portion of the billing that continues to be done by paper.

There is a need for an electronic bill payment system and method that is easy to use, fast, secure, private, and that fits well with existing processing centers and electronic billing formats. The system should replace the use of existing paper bills and checks to reduce the printing, processing, and postage costs of paper billing. The system should be able to send and receive billing and payment information over the Internet or phone lines with little exposure to security or privacy risks. The system should also be simple for consumers to use and should allow the consumer to view bill information on a computer in an understandable format. Finally, the system should allow consumers to quickly down-load and view bills on their computers without long delays in receiving bills from on-line resources.

SUMMARY OF THE INVENTION

A system and method for preparing and electronically delivering a bill to a billed party. The method may comprise receiving from a billing party an electronic bill file, preparing a redacted bill file from the electronic bill file by redacting selected secured billing information from the electronic bill file, sending the redacted bill file electronically to the billed party, and preparing and outputting a reconstructed bill at the billed party's computer by inserting the selected secured billing information into the redacted bill file. Throughout this specification, "redacting" will be used to refer to any method of removing, deleting, or editing the secured billing information from the full billing information of the electronic bill files. The act of preparing and outputting a reconstructed bill may further comprise the act of inserting at least one standard bill component into the redacted bill file to create a reconstructed bill. The method may further comprise receiving a payment instruction from a billed party that supplies a funds source identifier with the payment instruction, and, in response to the payment instruction, effecting electronic payment to the billing party from a funds source indicated by the funds source identifier.

Another embodiment of the invention may comprise receiving from a billing party an electronic bill file, preparing a redacted bill file from the electronic bill file, sending the redacted bill file electronically to the billed party, and preparing and outputting a reconstructed bill at the billed party's computer by inserting at least one standard bill component into the redacted bill file.

Another embodiment of the invention comprises a system for preparing and electronically delivering a bill to a billed party. The system may comprise a database on the billing party's computer system containing one or more electronic bill files, an electronic post office, a first software program existing on the computer system of the billing party, and a second software program stored on the billed party's computer. The first software program may include instructions for redacting selected secured billing information from the electronic bill file to create a redacted bill file that is communicated to the electronic post office. The second software program may include instructions for integrating selected secured billing information with the redacted bill file transmitted from the electronic post office to create a reconstructed bill on the billed party's computer.

Yet another embodiment of the invention comprises an electronic post office containing billing information, a software program stored on the billed party's computer, and the software program having local access to at least one standard bill component and including instructions for integrating the at least one standard bill component with billing information transmitted over a communication path from the electronic post office to create an image looking like a paper bill on the billed party's computer.

DESCRIPTION OF THE DRAWINGS

FIG. 4 is a detailed block diagram of the billing party/processor computer system of FIG. 1;

FIG. 5 is a flow chart showing the operation of the electronic payment system;

FIG. 6 is a block diagram detailing the presentment and payment of a bill;

FIG. 7 is a diagram of a sample reconstructed bill.

DETAILED DESCRIPTION a. General Overview

Figure 1:
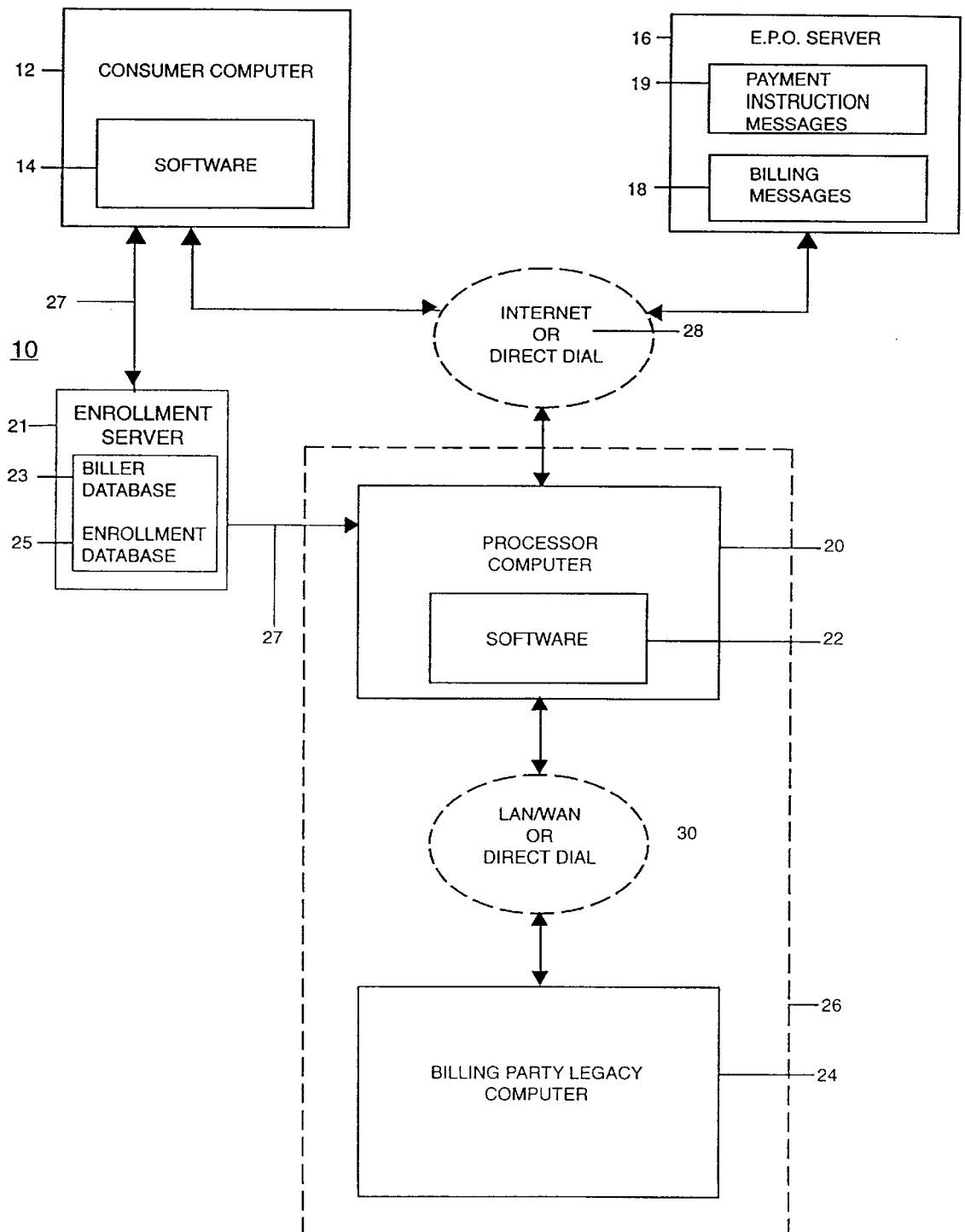
FIG. 1 is a block diagram overview of the electronic bill payment system.

The system of the present invention is shown in a general block-diagram form in FIG. 1. As shown in FIG. 1, the electronic payment system 10 generally comprises at least one consumer computer 12 with consumer software 14, an electronic post office server (E.P.O.) 16 with billing messages 18 and payment instruction messages 19, an enrollment server 21 with a biller database 23 and an enrollment database 25, and a billing/processor computer system 26. The consumer computer 12, electronic post office 16, and computer system 26 may be connected through communication path 28, which may be the Internet, a direct dial connection, or another suitable telecommunications path. If the communication path 28 is a direct dial connection, it would be considered a secure communication path for purposes of the present invention. The computer system 26 may consist of a processor computer 20 with processor software 22, a billing party legacy computer 24, and a connection 30 between the billing party legacy computer 24 and the processor computer 20. The communication path 30 may be a direct dial connection, a LAN/WAN connection, or another suitable telecommunications path. The communication path 27 between the enrollment server 21 and the consumer computer 12 (and the processor computer 20) may be a direct dial connection, a LAN/WAN connection, or another suitable telecommunications path.

Figure 2:
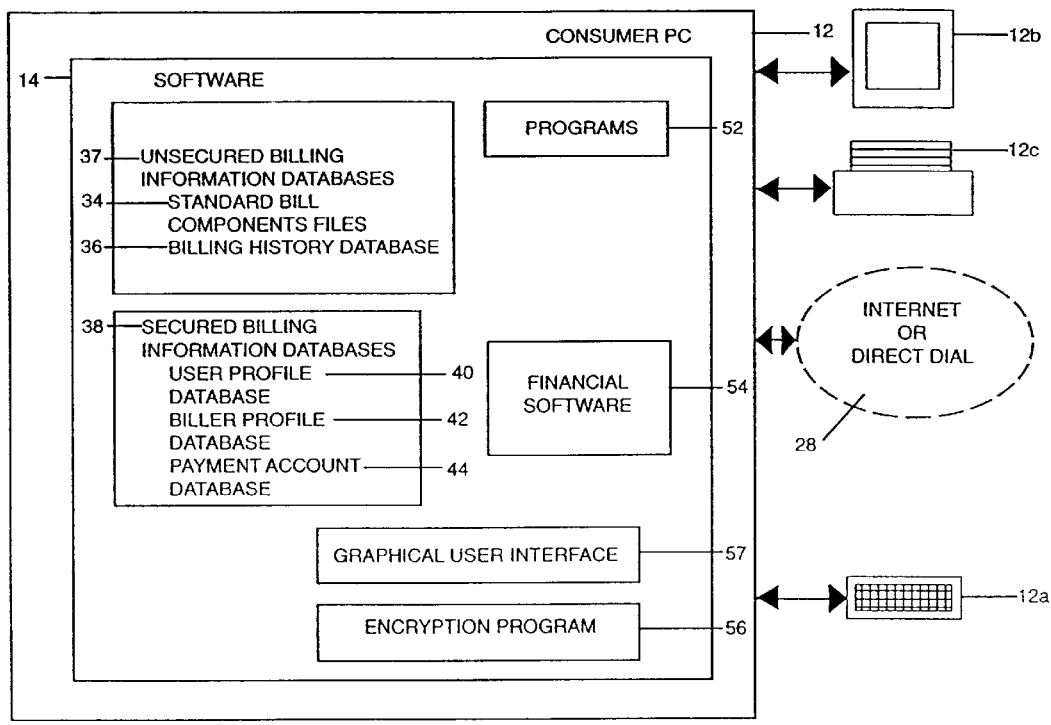
FIG. 2 is a detailed block diagram of the consumer computer of FIG. 1.

FIG. 2 shows the elements of the consumer computer 12 in greater detail. The consumer computer 12 may be any conventional computer, preferably a personal computer. The consumer computer 12 may comprise a processing unit or CPU and main memory (not shown), keyboard or input device 12a, output devices such as a display 12b and a printer 12c, and consumer software 14 stored on a storage device (not shown) such as a disk drive, hard drive, or network server that communicates with the CPU and main memory. The consumer computer 12 should be capable of communicating with other computers over communication path 28 using conventional means, such as a modem connection to the Internet or a direct dial connection.

In one embodiment, the consumer software 14 on consumer computer 12 may contain two groups of databases: unsecured billing information databases 37 and secured billing information databases 38. The unsecured billing information databases 37 may contain one or more standard bill components files 34 and a billing history database 36. The standard bill components files 34 are graphical image and text files that can be used to generate conventional bills on the consumer computer display 12b that replicate or resemble the paper bills to which the consumer is accustomed. A standard bill components file 34 may contain any graphic, layout, or text design that is used in or desirable for use in conventional bills. The standard bill components files 34 may be contained within a single database or spread throughout a number of databases on consumer computer 12. Throughout this specification, the term "database" is broadly used to refer to any collection of files within a computer, whether the files exist in the same folder or not. The billing history database 36 may contain billing information that has been transmitted to the consumer computer 12 from the electronic post office 16.

The secured billing information databases 38 may contain a variety of secured billing information. In the embodiment of FIG. 2, the secured billing information databases 38 contain a user profile database 40, a biller profile database 42, and a payment account database 44. The user profile database 40 may contain a variety of secured billing information for the consumer, such as the consumer's social security number, name, and address. The biller profile database 42 contains a variety of information about the billers who use the electronic payment system 10. The payment accounts database 44 may contain information concerning the consumer's payment methods, such as the consumer's bank account number or credit or debit card number.

Throughout this specification, "secured billing information" will be used to refer to any information (including those items listed above) that the consumer and/or billing party wishes to keep secure. The unsecured billing information databases 37 contain other, nonsensitive information about the consumer's bills. Throughout this specification, "nonsensitive billing information" (also referred to as unsecured billing information) will be used to refer to any information that is considered acceptable by billing program participants to transmit over the Internet or a similar unsecured communication path. A primary consequence of this distinction is that billing messages 18 are prepared and sent by the processor computer system 26 to the electronic post office 16 with redacted content only. Similarly, payment instruction messages 19 are prepared by consumer computer 12 and sent to the electronic post office 16 with redacted content only. That is, they are anonymous messages in which the billed party's name, social security number, address, and other identifying information is not present. Moreover, such identifying information would be impossible to obtain based solely on the information that the messages in the electronic post office 16 contain.

The consumer software 14 may contain programs 52 consisting of computer instructions (explained below) that help to integrate information from different sources in the electronic payment system 10. Additionally, the consumer software 14 may include an encryption program 56. This encryption program 56 can be any conventional encryption program known to those skilled in the art. The consumer may load financial software 54 on the computer 12. Two common home financial software packages include Quicken from Intuit and Microsoft Money. The financial software 54 could also be business accounting software, such as Great Plains Dynamics or QuickBooks from Intuit. The consumer software 14 may also include a graphical user interface 57 that allows the consumer to use the electronic payment system 10.

Figure 3:
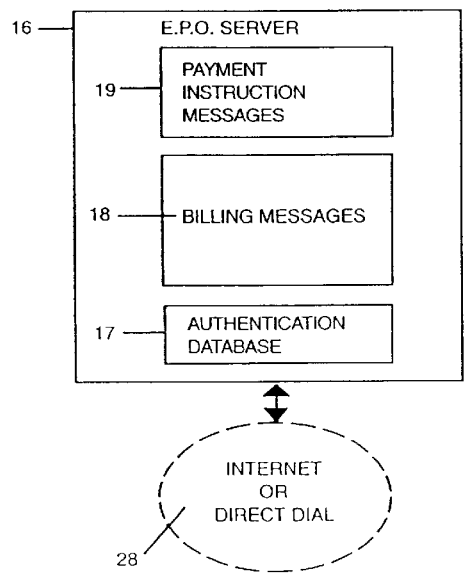
FIG. 3 is a detailed block diagram of the electronic post office (E.P.O.) of FIG. 1.

FIG. 3 shows the elements of the electronic post office 16 in greater detail. The electronic post office 16 may consist of any computer or network of computers that may function as a server on the Internet. This server functions primarily as a dedicated e-mail server, handling all billing and payment instruction messages that pass between the bill processor and the billed parties. The use of a dedicated server for the electronic post office 16 helps reduce the problem of inaccurate delivery of e-mail associated with standard SMTP e-mail. In one embodiment, therefore, the electronic post office 16 does not use SMTP e-mail, but instead uses a dedicated e-mail system which provides greater integrity of data delivery than does standard SMTP e-mail. In this embodiment, EPO-mail, which will be used to refer to electronic mail messages sent through the dedicated e-mail server, will be sent only directly (i.e., over a verified path) to the dedicated e-mail server, and will not be stored in various intermediate servers on the Internet as in SMTP e-mail. In this embodiment the electronic post office 16, consumer computer 12, and processor computer 20 preferably contain instructions in programs to allow the use of this dedicated e-mail system rather than standard SMTP e-mail. The electronic post office 16 may contain billing messages 18 that contain non-sensitive billing information, payment instructions messages 19, and an authentication database 17. The electronic post office 16 should be capable of communicating with other computers or computer networks over communication path 28.

As will be explained more fully below, the electronic post office 16 is managed to provide both privacy and security. The billing messages 18 are redacted so that the billed party remains anonymous. The payment instruction messages 19 are likewise anonymous; they do not identify the billed party. Moreover, neither the billing messages 18 nor the payment instruction messages 19 are stored on the electronic post office 16 on a long term basis. Both are deleted at or shortly after the time the messages are determined to have been communicated.

FIG. 4 shows computer system 26 consisting of the processor computer 20 and the billing party legacy computer 24. Billing parties, such as merchants, often use outside processing centers to process payments. Billing parties typically send electronic bill print files to the processing centers. A billing party, however, need not use a processing center. Instead, the billing party may operate the processing functions within its company on its own computer system. The computer system 26 of FIG. 4 depicts an outside processing center, represented by processor computer 20, connected to a billing party's computer system, billing party legacy computer 24. These two computer systems may be separate as in FIG. 4, but they may also be combined into one. Computer system 26, therefore, may collapse into one computer system. Throughout this specification, "billing party legacy computer" will be used to refer to the computer system of the billing party, such as billing party legacy computer 24, or to the combination of the billing party legacy computer 24 and the processor computer 20, which is depicted as computer system 26 in FIG. 4.

Billing party legacy computer 24 may be any conventional computer, computer network, or computer system. The billing party legacy computer 24 contains bill print files 70. These bill print files 70 are the standard electronic files containing billing information commonly created by billing parties. These bill print files 70 may be complete with standard bill components or be in a format that allows them to be merged with standard bill format images or printed on bill forms to produce a paper bill having the billing party's particular "look" and characteristics. The billing party legacy computer 24 may also contain an accounts receivable database 89, which may contain a variety of information relating to consumer bills and accounts.

Processor computer 20 may be any conventional computer, computer network, or computer system. The processor software 22 of processor computer 20 may include two databases: unsecured information 71 and secured information 79. Within unsecured information 71 may be a billing history database 73, a payment warehouse 75, and redacted bill files 77. The billing history database 73 may include an audit trail of the EPO-mail messages sent between the processor computer 20 and the consumer computer 12. The payment warehouse 75 may consist of payment instructions received from consumers. The redacted bill print files 77, which are explained below in more detail, may contain only non-sensitive billing information in one embodiment.

The secured information 79 may include a merchant profile database 81, customer (billed party) profile database 83, payment account database 85, and full bill print files 87. The merchant profile database 81 contains a variety of information relating to the various billing parties that use the electronic payment system 10. The customer profile database 83 contain a variety of information about the customers, such as consumers or businesses who are billed using the electronic payment system 10. The payment account database 85 may contain information such as consumers' payment methods, bank account numbers, and credit or debit card numbers. The full bill print files 87 correspond to the bill print files 70 in the biller computer 24, and contain the full billing information for consumers. Throughout this specification, "billing information" will be used to refer to any combination of billing information for a consumer, including secured billing information and/or non-sensitive billing information. The full bill print files 87, therefore, may contain both secured billing information and non-sensitive billing information.

The programs 80 within the processor computer 20 may include redacting instructions (explained below) to remove secured billing information from bill print files, as well as other conventional database and editing computer software packages. Processor computer 20 may also contain an encryption program 82. This encryption program 82 should be compatible with encryption program 56 on the consumer's computer 12. Processor computer 20 should be capable of communicating with other computers or computer networks over communication path 28. Processor computer 20 and billing party legacy computer 24 should be able to communicate over connection 30.

FIG. 5 is a flow chart showing the typical activities in the set-up and operation of the electronic payment system 10. The vertical columns identify the location where, or actor by which, various functions are performed. There is a column for the billed party which contains consumer computer 12, a column for the service provider which contains the electronic post office server 16 and the enrollment server 21, a column for the billing party which contains the billing party legacy computer 24, and a column for the bill processor which contains processor computer 20. The dotted line around the billing party legacy computer 24 and the processor computer 20 reflects the possibility that these two systems may be combined into one computer system 26. The three broad horizontal sections of FIG. 5 represent the three primary phases in the set-up and operation of the electronic payment system 10: Registration and enrollment 90 of the consumer with the electronic payment system 10, presentment 92 of bills to the consumer, and payment 94 of bills by the consumer.

b. Registration and Enrollment

Registration and enrollment 90 may be the first phase in initiating the electronic payment system 10. In registration and enrollment 90, the consumer registers as a user with the electronic post office 16 and enrolls with billing parties to use the electronic payment system 10. The consumer registers and receives a randomly assigned EPO-mail address so that the billing party and the electronic post office 16 have a method of routing information to and from the consumer.

FIG. 5 depicts one method in which registration and enrollment 90 may occur. During registration, the consumer may receive information about the electronic payment system 10 in a variety of ways. The consumer could read a mailer, an insert in a bill, an advertisement, or a web page on the WWW to learn about the electronic payment system 10. At block 96, the consumer receives information to register in the electronic payment system 10. FIG. 5 shows one possible scenario of block 98, in which the consumer connects to a web page operated by the billing party or the processor to find a set-up program for the electronic payment system 10. At block 100, the consumer downloads the set up program from the WWW. In another embodiment, a processor or billing party could send the consumer a set-up program via traditional mail service.

At block 102 of FIG. 5, the consumer runs the set-up program. The set-up program may lead the consumer through the entry of registration information and then dial into the electronic post office 16 to register the information. At block 104, the electronic post office 16 gathers information from the consumer and builds a file in authentication database 17 for the consumer (FIG. 3). The authentication database 17 contains information so that the billing party and the electronic post office 16 can communicate with the consumer's computer 12. This information may include a routing number or an EPO-mail address at the electronic post office 16 that allows the consumer to communicate with the electronic post office 16. To provide security for the consumer's EPO-mail address, the registration may occur over a secured communication path, such as a direct dial connection. During registration the consumer may also choose or be given a password that restricts communication with the electronic post office 16. Other methods of security, such as digital signature protection, could also protect access to consumer's information at the electronic post office 16. At block 106, the consumer receives consumer software 14 for his/her computer for operation of the electronic payment system 10 (FIG. 1). In FIG. 5, the electronic post office 16 may send the software 14 over a direct dial connection to the consumer's computer 12.

The consumer software 14 sent to the consumer may contain a list of billing parties that allows the consumer to enroll with billing parties that use the electronic payment system 10. During enrollment at block 107, the consumer exchanges information with the enrollment server 21 so that billing parties have enrollment data from the consumer. This enrollment data may include secured billing information that will allow a billing party to debit funds from a consumer's account or charge a consumer's credit account upon authorization from the consumer. At block 108 in FIG. 5, the processing center receives the enrollment of a consumer from the enrollment server 21. All secured billing information may be gathered at block 108 over a direct dial connection or secured communication path to provide security. This secured billing information may include the name and address of the consumer, account numbers, and the consumer's social security number. The secured billing information may be stored in the customer profile database 83 in the processor computer 20 (FIG. 4), and may also be stored locally in a storage device on the consumer's computer 12.

The secured billing information in customer profile database 83 should be sufficient to allow the billing party or processor to charge a consumer's credit account or withdraw money from a consumer's bank account upon authorization from the consumer. As noted earlier, an authentication identifier, such as an EPO-mail address supplemented by a password, is set up to allow the processor or billing party to receive payment instructions from a consumer without the transfer of secured billing information. The consumer could also set up separate codes corresponding to different payment methods, such as withdrawal from the consumer's bank account or a credit charge to the consumer's credit account. These codes, also called funds source identifiers, would allow the processor to identify a funds source associated with a payment option. At block 110, the consumer receives payment information from the billing party. At block 112, the processor logs the enrollment of the consumer in the electronic payment system 10 for the billing party's records. The consumer must, in one embodiment, enroll separately or together with each billing party from which the consumer desires to obtain electronic bills.

c. Presentment of a Bill

Presentment 92 of the bill to the consumer may be the next element in the operation of the electronic payment system 10. In presentment 92, bills are presented to the consumer's computer 12 so the consumer may manipulate, view, and pay bills.

The presentment 92 of the bill to the consumer in FIG. 5 begins at block 114, in which the billing party prepares electronic bill print files. The billing party may prepare bill print files 70 (shown in FIG. 4) that contain full billing information 74 (shown in FIG. 6) in the ordinary fashion. The electronic payment system 10, therefore, may allow the billing party to use the same processing center as used for paper billing by sending the same bill print files 70 to the processing center. At block 116 of FIG. 5, the bill print files 70 are received by the processor computer 20 from the billing party legacy computer 24 (FIG. 4). The bill print files 70 may be sent over an existing LAN/WAN connection, over a direct dial connection, or over another secured communication path. The processor software 22 of the processor computer 20 may then prepare a redacted bill file (which may be an EPO-mail message) to send to the electronic post office 16 at block 116 of FIG. 5. The processor software 22 on the processor computer system 24 should be capable of converting standard bill print files 70 from the billing party legacy computer 24 to redacted bill files 150 (shown in FIG. 6) that may be stored as EPO-mail billing messages 18 in the electronic post office 16.

At block 116 of FIG. 5, the redacting instructions of the programs 80 (shown in FIG. 4) in processor software 22 on the processor computer 20 may redact all secured billing information 76 (shown in FIG. 6) from the full billing information 74 sent electronically from the billing party as a bill print file. FIG. 4 shows the programs 80 containing redacting instructions on the processor computer 20 and full bill print files 87 stored within the secured information 79. The programs 80 containing redacting instructions create the non-sensitive billing information in the redacted print files 77 by redacting the secured billing information 76 from the full billing information 74 (shown in FIG. 6) of the full bill print files 87. The non-sensitive billing information is incorporated into a redacted bill file 150 (as shown in FIG. 6), which may be sent to the electronic post office 16. In one embodiment, each bill is randomly assigned a bill identification number so that the processor and electronic post office 16 can identify the bill. (Throughout this specification, "redacting" will be used to refer to any method of removing, deleting, or editing the secured billing information 76 from the full billing information 74 of the bill print files.) The act of redacting to create the non-sensitive billing information (and the redacted bill file 150) can be accomplished by any conventional means.

One method of redacting information is searching for a particular known field, such as that for a name or address, within the full billing information 74, and removing any further instances of that same information anywhere it appears in the remainder of the full billing information 74. This helps ensure that all instances of the information are redacted, even if it appears in unexpected fields. An encryption program 82 on the processor computer 20 may also be used to encrypt the redacted bill file 150 of non-sensitive billing information prior to sending it to the electronic post office 16.

If the full billing information 74 (shown in FIG. 6) includes graphic elements or standard text for terms of credit or other legal disclosures that are part of the bill, the size of the redacted bill file 150 can be further reduced by redacting this information as well. Such information, which may be contained within standard bill components files 34, must then be stored at the consumer computer 12 for use in reconstructing the bill to be viewed at the consumer computer 12.

The redacted bill file 150 is sent from the processor computer 20 to the electronic post office 16 and is stored as an EPO-mail message for a particular billed party in the electronic post office 16 at block 118 of FIG. 5. Gathering billing information (as redacted bill files 150) in the electronic post office 16 can be accomplished by a variety of conventional means suitable for sending messages in EPO-mail format. Because secured billing information 76 is stripped from full billing information 74 at block 116, in one embodiment only non-sensitive billing information exists in the billing messages 18 of the electronic post office 16 (FIG. 3). This non-sensitive billing information may be stored in the electronic post office 16 until the consumer requests bills.

The bill print files 70 received from the billing parties contain positional directions that show where text fits into graphics overlays. In one embodiment, the positional relationships (i.e., x-y positions) of the secured billing information 76 in the electronic bill print files 70 are used to determine where to insert the secured billing information 76 into the standard bill components files 34 on consumer computer 12. When the secured billing information 76 is stripped from full billing information 74 at block 116, therefore, a record of the positional directions of the bill print files 70 may be kept. These positional directions may then be sent with the redacted bill print files 70 to consumer computer 12. The positional directions may then be used to determine where to insert the information from the secured billing information databases 36 into the standard bill components files 34 on consumer computer 12 to reconstruct the bill. In this embodiment, therefore, the electronic payment system 10 does not depend on dissecting all elements of the bill print file 70 to create a new relational database to be used to generate an HTML file that will drive the consumer's display. The advantage of this embodiment is that only the positional relationship of the elements must be understood. If a relational database were to be constructed, on the other hand, an understanding of the redacted information for every element in a page would be necessary in order for an HTML representation of a bill to be presented on consumer computer 12.

Referring again to FIG. 5, the bills stored in the electronic post office 16 are presented to the consumer when the consumer requests the bills at block 120. At block 120, the consumer may connect to the electronic post office 16 over the Internet or over a direct dial connection. The consumer may then request and receive information about bills. The consumer may then disconnect from the Internet or direct dial connection to view the bills. In one embodiment, the non-sensitive billing information in the electronic post office 16 is automatically transmitted to the consumer's computer 12 and stored in a storage device of the consumer's computer 12 (FIG. 2). In this embodiment, the consumer does not wait to receive EPO-mail on-line, but rather receives it by pre-arrangement. Here, the non-sensitive billing information is downloaded to a storage device on the consumer's computer 12 for off-line review. Referring to FIG. 2, with either mode of access, the non-sensitive billing information (depicted as a redacted bill file 150 in FIG. 6) is stored in the billing history database 36 on the consumer computer 12. The consumer may then view reconstructed bills quickly, without being connected to the Internet, by loading data that is stored locally on the consumer's computer 12. If a consumer does not request a bill, the electronic post office 16 may send an EPO-mail message to the consumer as a reminder.

When the consumer wishes to view a bill, the consumer may use the consumer software 14 to select a bill to be viewed. In order to present the bill to the consumer, the non-sensitive billing information in the billing history database 36 is integrated with the standard bill components files 34 and information from the databases in the secured billing information databases 38 stored in the storage device on the consumer's computer 12. The instructions of the programs 52 on the consumer's computer 12 combine the information from the secured billing information databases 38 with the non-sensitive billing information to create a reconstructed bill 154 (shown in FIGS. 6 and 7). This reconstructed bill 154 may contain all of the information and graphic or standard text elements that a customary paper bill contains. For instance, secured information from the user profile database 40, such as the consumer's social security number, name, and address, may appear on the reconstructed bill 154. Similarly, secured information from the biller profile database 42 and payment account database 44, such as billing account numbers, could appear on the reconstructed bill 154. This information from the secured billing information databases 38 can appear on the reconstructed bill 154 even though it was not sent with the non-sensitive billing information to the consumer's computer 12, because it is stored locally on the consumer's computer 12. An encryption program 56 may be used on the consumer's computer 12 if data sent from the processing computer system 20 is encrypted.

The instructions in the programs 52 may also integrate one or more of the standard bill components files 36 stored on the consumer's computer 12 with the non-sensitive billing information. The resulting reconstructed bill 154 can appear on the consumer's computer display 12b to replicate or resemble a customary paper bill and/or be printed on printer 12c to provide a hard copy. In one embodiment, this reconstructed bill 154 is essentially a replica of a printed paper bill. This gives the consumer a comfortable familiarity with the electronic payment system 10 and increases consumer acceptance of the system. Because the secured billing information and standard bill components files 36 are stored locally on the consumer's computer 12, the data downloaded are limited and the consumer can normally obtain and view a bill within a matter of seconds. This allows elaborate billing party logos, rich graphics, shading, or other graphics and images and/or standard text to appear on bills without creating a long delay to the consumer in displaying a bill. By contrast, a conventional on-line billing system may require minutes to load graphics and data as part of a web page.

FIG. 6 further illustrates the presentment 92 of a bill. FIG. 6 contains sections detailing the activities within the billing party legacy computer 24, processor computer 20, electronic post office 16, and consumer computer 12 during presentment 92 of a bill. FIG. 6 also illustrates the transfer of information between the systems of the electronic payment system 10.

The billing party legacy computer 24, as shown in FIG. 6, contains the full billing information 74 (contained in the bill print files 70 of FIG. 4) for a consumer. The full billing information 74 contains, for example, the consumer's name, address, account number, amount due, due date, and the billing coverage period for the billing cycle. An electronic bill file containing the full billing information 74 is transmitted from the billing party legacy computer 24 to the processor computer 20 via a LAN/WAN connection or other similar secured communication path. In one embodiment, this full billing information 74 is stored as the full bill print files 87 of FIG. 4. The full bill print files 87 are redacted in the processor computer 20 (at block 116 of FIG. 5) by redacting the secured billing information 76 from the full bill print files 87 to create a redacted bill file 150. This redacted bill file 150 (shown as redacted bill print files 77 in FIG. 4) may contain only non-sensitive billing information, which the consumer and/or billing party consider acceptable to pass over the Internet. In one embodiment, the nonsensitive billing information in the redacted bill file 150 may consist of an amount due, dates of the billing period, due date for the bill, other bill details, and a randomly assigned bill identification number to identify the bill.

FIG. 6 illustrates the transmission of the redacted bill file 150 from the processor computer 20 to the electronic post office 16. The dedicated electronic post office 16 of FIG. 6 does not contain secured billing information 76 in this embodiment. Rather, it contains only billing information that the consumer and/or billing party consider acceptable to pass over the Internet. As shown in FIG. 3, this billing information is stored as billing messages 18 in the electronic post office 16.

When the consumer wishes to download a bill from the electronic post office 16 to the consumer computer 12, the redacted bill file 150 (stored as billing messages 18 in the electronic post office 16) is transmitted from the electronic post office 16 to the consumer computer 12 (as seen in FIG. 6). Once again, only non-sensitive billing information is transmitted over the Internet. In one embodiment, the redacted bill file 150 is stored locally on the consumer's computer 12 in the billing history database 36. The redacted bill file 150 is then integrated with information from the secured billing information databases 38 and the standard bill components files 34 stored on the consumer's computer 12 to form a reconstructed bill 154 on the consumer's computer 12. Throughout the entirety of this process, only non-sensitive billing information is present on the Internet. In one embodiment of the electronic payment system 10, the redacted bill files 150 (shown as billing messages 18 in FIG. 3) are only temporarily stored in the electronic post office 16. Even this non-sensitive billing information, therefore, is not warehoused in the electronic post office 16. Although an abbreviated audit trail of messages may exist, the information itself is not permanently present in the electronic post office 16.

FIG. 7 illustrates a sample reconstructed bill 154 on the consumer's computer 12. The reconstructed bill 154 contains information from the secured billing information databases 38, such as the consumer's name, address, and account number. The reconstructed bill 154 also contains non-sensitive billing informnation, such as the amount due on the current bill, due date of the bill, and coverage period of the bill. FIG. 7 also illustrates sample graphics 160 and standard text 162 that may be stored on the consumer's computer 12 as standard bill components files 34 and integrated into the reconstructed bill 154.

Block 120 of FIG. 5 may also involve the transmission of new standard bill components files 34. The standard bill components files 34 may be transmitted with the full billing information 74 (as seen in FIG. 6) from the billing party legacy computer 24 to the processor computer 20. The standard bill components files 34 may then be sent from the processor computer 20 to the electronic post office 16 at block 118 of FIG. 5 (and with the transmission of the redacted bill file 150 in FIG. 6), and then to the consumer computer 12. Once the standard bill components files 34 for a given bill format are sent to the consumer computer 12, these same standard bill components files 34 will not need to be sent to the consumer computer 12 again; only standard bill components files 34 for new bill formats need to be sent to the consumer computer 12.

In one embodiment, the standard bill components files 34 are only transmitted from the processor computer 20 to the electronic post office 16 the first time a new billing format is to be delivered to a consumer. The processor computer 20, therefore, will not send standard bill components files 34 along with redacted bill files 150 to the electronic post office 16 if those same standard bill components files 34 have already been sent to any consumer computer 12. Once the standard bill components files 34 exist in the electronic post office 16, these standard bill components files 34 may be sent to any number of consumers using the same billing format. Refraining from sending the standard bill components files 34 from the processor computer 20 to the electronic post office 16 with each billing message saves storage space in the electronic post office 16. Refraining from transmitting standard bill components files 34 from the electronic post office 16 to the consumer computer 12 saves both the electronic post office 16 and consumer time that would unnecessarily be spent if the standard bill components files 34 were transmitted to the consumer computer 12 multiple times.

In an alternative embodiment, the instructions of the programs 52 on the consumer's computer 12 may be capable of determining whether a standard bill components file 34 corresponding to a redacted bill file 150 being sent from the electronic post office 16 to the consumer's computer 12 exists on the consumer's computer 12 as standard bill components files 34 (FIG. 2). If the specific standard bill components files 34 are not present on the consumer's computer 12, the instructions of the programs 52 may request the delivery of these files from the electronic post office 16 so that the electronic post office 16 can send the standard bill components files 34 to the consumer's computer 12. If the electronic post office 16 contains the standard bill components files 34, it could forward a copy to the consumer computer 12. If the electronic post office 16 does not contain the standard bill components files 34, it could request the processor computer 20 to send the standard bill components files 34 to the electronic post office 16. Once a specific standard bill components file 34 is stored on the consumer's computer 12, that standard bill components file 34 does not need to be sent to the consumer's computer 12 again.

In another embodiment of blocks 118 and 120 in FIG. 5, advertising information could be sent from the processor computer 20 to the electronic post office 16 along with the nonsensitive billing information. In one embodiment, the advertising information could be sent down as standard bill components files 34. This advertising information could then be sent with non-sensitive billing information to the consumer's computer 12 at block 120. The consumer may view the advertising information when viewing bills. This feature allows billing parties to enclose advertising material in electronic bills that is similar to the advertising information that billing parties enclose in customary paper bills. In another embodiment, the system could allow the advertising information to be interactive with the consumer, so that the consumer can request information on various products or services.

d. Payment of a Bill

Payment 94 of the bill may be the next component in the operation of the electronic payment system 10. After the consumer views the bill, the consumer can pay the bill or schedule for payment of the bill to occur at some time in the future. At block 122 of FIG. 5, the consumer electronically pays the bill by preparing an EPO-mail payment instruction message. The consumer software 14 on the consumer's computer 12 may contain a graphical user interface 57 of buttons, bars, and graphics that makes paying bills as simple as clicking on one button (FIG. 2). The graphical user interface 57 of the consumer software 14 may be any conventional style known by those skilled in the art. The graphical user interface 57 may contain checkboxes, text-input boxes, or clickable icons (and other conventional software user interfaces) for sending, paying, and displaying bills, and it may also have user interfaces for temporarily holding a bill or for creating a memorandum to send to the billing party. The consumer software 14 may also be capable of generating reports and summaries for paid and unpaid bills.

The consumer may pay a bill by sending payment authorization to the electronic post office 16. When the consumer authorizes payment of a bill, electronic payment instructions 152 are sent using the Internet or direct dial connection to the electronic post office 16, as shown in FIG. 6. As described in connection with block 104 of FIG. 5, the consumer may have a randomly assigned EPO-mail address at the electronic post office 16 that allows the consumer to communicate with the electronic post office 16. The electronic post office 16 should be capable of accepting payment instructions 152 from the consumer. FIG. 3 shows payment instruction messages 19 in the electronic post office 16 for storage of the payment instructions 152. Block 124 of FIG. 5 depicts the receipt of payment instructions 152 by the electronic post office 16.

The payment instructions 152 may include information sufficient to allow identification of the bill, such as the randomly assigned bill identification number discussed previously. In one embodiment of the present invention, the payment instructions 152 from the consumer at block 122 contain only non-sensitive information, such as the date to pay the bill, the amount to pay, and a funds source identifier corresponding to the payment method the consumer wishes to use. In this embodiment, which is shown in FIG. 6, the payment instructions 152 do not contain secured billing information 76 such as a bank account number, the consumer's name, or the consumer's credit card number. Thus, the payment instruction messages do not add any secured information to the electronic post office 16. However, for further security, the payment instructions 152 from the consumer may also be encrypted using the encryption program 56 on the consumer's computer 12.

The consumer software 14 of the consumer's computer 12 may also allow the consumer to send other information to the billing party or processor with the payment instructions 152. The consumer software 14 could allow the consumer to send a memorandum to the billing party containing compliments or complaints. Name and address changes and orders for service are other examples of information the consumer may wish to attach to the payment instructions 152 at block 122 of FIG. 5.

At block 128 of FIG. 5, a record of the payment information is recorded on the consumer's computer 12. The consumer software 14 on the consumer's computer 12 may allow the consumer to save billing information and payment information to the storage device of the consumer's computer 12. In one embodiment the consumer software 14 may save the billing and payment information to a commercial financial software package 54 that allows the consumer to manipulate the information. In another embodiment, the payment information may be saved to the payment account database 44 shown in FIG. 2. The billing and payment information, therefore, could be saved at block 128 in a variety of formats that allows home financial software packages 54 to read the information.

The payment instructions 152 sent by the consumer to the electronic post office 16 may be stored as payment instruction messages 19 (shown in FIG. 3). The billing party or processor may regularly request payment information from the electronic post office 16. At block 126 of FIG. 5, a billing party or processor requests payment information. FIG. 6 shows the transmission of payment instructions 152 from the electronic post office 16 to the processor computer 20. In the embodiment of FIG. 6, the payment instructions 152 do not contain secured billing information 76. In one embodiment, the payment instruction messages 19 are not warehoused on the electronic post office 16. Instead, the payment instruction messages 19 exist on the electronic post office 16 only until they are transmitted to the processor computer 20.

One preferred method of payment for processing centers is electronic funds transfer through the Federal Reserve Automated Clearing House Network (ACH). After the processor receives payment authorization from the consumer via the electronic post office 16, the processor may prepare and electronically send ACH payments at block 130. In one embodiment of the invention, the processor software 22 on the processor computer 20 is capable of processing reports from billing information and payment instructions 152, preparing files for the billing parties regarding bill status and payment, and preparing and sending ACH payments (FIG. 4). The electronic payment system 10 may also be capable of using the ATM (automatic teller machine) Network, credit card network, or other private payment network to cause payments to be made.

At block 134, a posting file is sent to the billing party by the processor to notify the billing party that a payment has been made. The billing party can then update its records to reflect the status of a bill as paid.

e. Summary The present invention provides a method and system for electronically paying bills. The method and system eliminates the need for paper bills and reduces the costs associated with paper billing, often by over 50%. It is capable of using existing processing centers, current banking systems, and bill print files created by billing parties. It also may allow a billing party to have availability of funds more quickly than in a paper billing system. The invention provides a system and method for electronically paying bills with improved security and privacy, and does not warehouse secured billing information on the WWW. Because private information, such as a user's name and address or account numbers, is not transmitted on the Internet, the invention provides anonymous bill delivery. The invention allows a consumer to quickly view bills from information that is downloaded to a local storage device on the consumer's computer 12. The bills appear on the consumer's computer screen in a form resembling the paper bills that the consumer customarily receives. Finally, the electronic payment system 10 reduces processing errors through computerization and reduces the amount of time required to process payments.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims.

I claim:

1. A method for preparing and electronically delivering a bill to a billed party, wherein selected secured billing information is stored on the billed party's computer, the method comprising:
   (a) receiving from a billing party an electronic bill file including the selected secured billing information;
   (b) preparing a redacted bill file from the electronic bill file by redacting the selected secured billing information;
   (c) sending the redacted bill file electronically to the billed party; and
   (d) preparing and outputting a reconstructed bill at the billed party's computer by inserting the selected secured billing information into the redacted bill file.

2. The method for preparing and electronically delivering a bill of claim 1, wherein the act of sending the redacted bill file is accomplished by sending the redacted bill file via a dedicated e-mail server.

3. The method for preparing and electronically delivering a bill of claim 1 further including the act of storing on the billed party's computer selected secured billing information.

4. The method for preparing and electronically delivering a bill of claim 1, wherein at least one standard bill component is stored on the billed party's computer and the electronic bill file further includes at least one standard bill component removed in preparing the redacted bill file, wherein the act of preparing and outputting a reconstructed bill further comprises the act of inserting the at least one standard bill component into the redacted bill file.

5. The method for preparing and electronically delivering a bill of claim 4 further including the act of storing on the billed party's computer at least one standard bill component.

6. The method for preparing and electronically delivering a bill of claim 1, further comprising:
   (a) receiving a payment instruction from a billed party that supplies a funds source identifier with the payment instruction; and
   (b) in response to the payment instruction, effecting electronic payment to the billing party from a funds source indicated by the funds source identifier.

7. The method for preparing and electronically delivering a bill of claim 1 further including the act of enrolling the billed party with the billing party, the act of enrolling including the act of delivering selected secured billing information from the billed party to the billing party.

8. The method for preparing and electronically delivering a bill of claim 1 further including the act of encrypting the redacted bill file prior to sending the redacted bill file to the billed party.

9. The method for preparing and electronically delivering a bill of claim 1 further including the act of posting payment information to the billed party's computer.

10. The method for preparing and electronically delivering a bill of claim 1 further comprising:
   (a) receiving a payment instruction from a billed party that identifies the redacted bill file but not the billed party; and
   (b) in response to the payment instruction, effecting electronic payment from a funds source previously identified by the billed party.

11. The method for preparing and electronically delivering a bill of claim 1, wherein the act of receiving includes receiving an electronic bill file that is a legacy bill print file, wherein the act of preparing a redacted bill file further includes deleting selected secured billing information based on positional relationships of selected secured billing information in the legacy bill print file, and wherein the act of preparing and outputting a reconstructed bill includes inserting the selected secured billing information by using the same positional relationships from the legacy bill print file.

12. A method for preparing and electronically delivering a bill to a billed party, wherein at least one standard bill component is stored on the billed party's computer, the method comprising:
   (a) receiving from a billing party an electronic bill file;
   (b) preparing a redacted bill file from the electronic bill file;
   (c) sending the redacted bill file electronically to the billed party; and
   (d) preparing and outputting a reconstructed bill at the billed party's computer by inserting the at least one standard bill component into the redacted bill file.

13. The method for preparing and electronically delivering a bill of claim 12, wherein the act of receiving includes receiving an electronic bill file that is a legacy bill print file, wherein the act of preparing a redacted bill file further includes deleting information based on positional relationships of information in the legacy bill print file, and wherein the act of preparing and outputting a reconstructed bill includes inserting the information by using the same positional relationships from the legacy bill print file.

14. The method for preparing and electronically delivering a bill of claim 12 further including the act of sending at least one standard bill component from the billing party to the billed party's computer before the billed party receives any redacted bill file.

15. The method for preparing and electronically delivering a bill of claim 12, further comprising selectively sending at least one standard bill component at the time a redacted bill file is sent by sending only standard bill components that are not already stored on the billed party's computer.

16. The method for preparing and electronically delivering a bill of claim 12 further including the act of storing on the billed party's computer at least one standard bill component sent by the billing party.

17. The method for preparing and electronically delivering a bill of claim 12, further comprising:
   (a) receiving a payment instruction from a billed party that supplies a funds source identifier with the payment instruction; and
   (b) in response to the payment instruction, effecting electronic payment to the billing party from a funds source indicated by the funds source identifier.

18. The method for preparing and electronically delivering a bill of claim 12 further including the act of enrolling the billed party with the billing party, the act of enrolling including the act of delivering selected secured billing information from the billed party to the billing party.

19. The method for preparing and electronically delivering a bill of claim 12 further including the act of encrypting the redacted bill file prior to sending the redacted bill file to the billed party.

20. The method for preparing and electronically delivering a bill of claim 12 further including the act of posting payment information to the billing party's computer.

21. The method for preparing and electronically delivering a bill of claim 12 further comprising:
   (a) receiving a payment instruction from a billed party that identifies the redacted bill file but not the billed party; and
   (b) in response to the payment instruction, effecting electronic payment from a funds source previously identified by the billed party.

22. A method for preparing and electronically delivering a bill to a billed party with a computer, the method comprising:
   (a) storing a redacted bill file that has been prepared from an electronic bill file by redacting selected secured billing information from electronic bill file billing information; and
   (b) sending the redacted bill file electronically via a dedicated e-mail server to the bill party, the redacted bill file having sufficient billing information to prepare and output a reconstructed bill at the billed party's computer by merging selected secured billing information stored on the billed party's computer with the redacted bill file.

23. A system for preparing and electronically delivering a bill from a billing party with a computer system to a billed party, wherein selected secured billing information is stored on the billed party's computer, the system comprising:
   (a) a database on the billing party's computer system containing one or more electronic bill files, the electronic bill files including the selected secured billing information;
   (b) an electronic post office;
   (c) a first software program existing on the computer system of the billing party, the first software program including instructions for redacting the selected secured billing information from the electronic bill files to create a redacted bill file that is communicated to the electronic post office; and
   (d) a second software program stored on the billed party's computer, the second software program including instructions for integrating the stored selected secured billing information with the redacted bill file transmitted from the electronic post office to create a reconstructed bill on the billed party's computer.

24. The system for preparing and electronically delivering a bill of claim 23 wherein the electronic post office is a dedicated e-mail server, and wherein the first software program and second software program each include instructions for communicating with the electronic post office.

25. The system for preparing and electronically delivering a bill of claim 23 wherein the first software program further includes an encryption program.

26. The system for preparing and electronically delivering a bill of claim 23 wherein the second software program further includes an encryption program.

27. The system for preparing and electronically delivering a bill of claim 23 wherein the second software program has local access to at least one standard bill component and second instructions for integrating the at least one standard bill component with the redacted bill file to create a reconstructed bill on the billed party's computer.

28. The system for preparing and electronically delivering a bill of claim 23 further including a graphical user interface on the billed party's computer to allow the billed party to manipulate and view the reconstructed bill.

29. A system for preparing and electronically delivering a bill from a billing party to a billed party with a computer, the system comprising:
   (a) an electronic post office containing billing information;
   (b) a software program stored on the billed party's computer; and
   (c) the software program having local access to at least one standard bill component and including instructions for integrating the at least one standard bill component with billing information transmitted over a communication path from the electronic post office to create an image resembling a paper bill on the billed party's computer.

30. The system for preparing and electronically delivering a bill of claim 29 further including a graphical user interface on the billed party's computer to allow the billed party to manipulate and view the reconstructed bill.

31. The system for preparing and electronically delivering a bill of claim 29 wherein the software program further includes an encryption program.

32. A system for preparing and electronically delivering a bill from a billing party with a computer system to a billed party, wherein selected secured billing information is stored on the billed party's computer, the system comprising:
   (a) means for receiving from a billing party an electronic bill file including the selected secured billing information;
   (b) means for preparing a redacted bill file from the electronic bill file by redacting the selected secured billing information;
   (c) means for sending the redacted bill file electronically to the billed party; and
   (d) means for preparing and outputting a reconstructed bill at the billed party's computer by inserting the selected secured billing information into the redacted bill file.

* * * * *